United States Patent [19]

Pearson et al.

[11] 4,193,607
[45] Mar. 18, 1980

[54] CHUCK WITH OPPOSED GRIPPING

[75] Inventors: John Pearson, Garden Grove; Homer L. Eaton, Leucadia, both of Calif.

[73] Assignee: Eaton-Leonard Corporation, Carlsbad, Calif.

[21] Appl. No.: 891,922

[22] Filed: Mar. 30, 1978

[51] Int. Cl.² .......................................... B23D 31/40
[52] U.S. Cl. .............. 279/1 DC; 279/1 DA; 279/1 L
[58] Field of Search ............ 279/1 DC, 1 DA, 1 ME, 279/1 A, 1 L, 37, 4, 1 B, 38, 1 S, 35, 106; 72/117, 393, 312, 316

[56] References Cited

U.S. PATENT DOCUMENTS

| | | | |
|---|---|---|---|
| 1,118,072 | 11/1914 | Thompson | 279/107 |
| 2,362,146 | 11/1944 | Mariotte | 279/4 |
| 2,394,841 | 2/1946 | Bugg | 279/1 DC |
| 2,438,999 | 4/1948 | Hartley et al. | 72/312 X |
| 2,567,605 | 9/1951 | Kean | 279/37 |
| 2,985,455 | 5/1961 | Powell | 279/4 |
| 3,076,662 | 2/1963 | Kostyrka | 279/1 ME |
| 3,542,383 | 11/1970 | Farley et al. | 279/1 DA |
| 3,599,996 | 8/1971 | Holt | 279/1 B |
| 4,032,163 | 6/1977 | Holt | 279/1 B X |

FOREIGN PATENT DOCUMENTS 2246342 5/1975 France ............................ 279/1 A Primary Examiner—William R. Briggs
Attorney, Agent, or Firm—Gausewitz, Carr & Rothenberg

[57] ABSTRACT

For grasping and rotating a tube having a flared end and a rotatable flare fitting thereon a chuck carries a number of pivoted clamps movable radially inwardly against the fitting. An opposing pilot on the chuck enters the end of the tube to axially bear against the inside of the flared end, thereby clamping the rotatable fitting against the tube between the clamps and pilot for a firm grip on the tube end. The clamps and pilot are driven into opposing gripping relation by a slidable chuck housing sleeve which, in turn, is axially driven by a non-rotating thrust block. The housing sleeve, clamps and pilot are all carried for rotation on a driven shaft.

25 Claims, 8 Drawing Figures

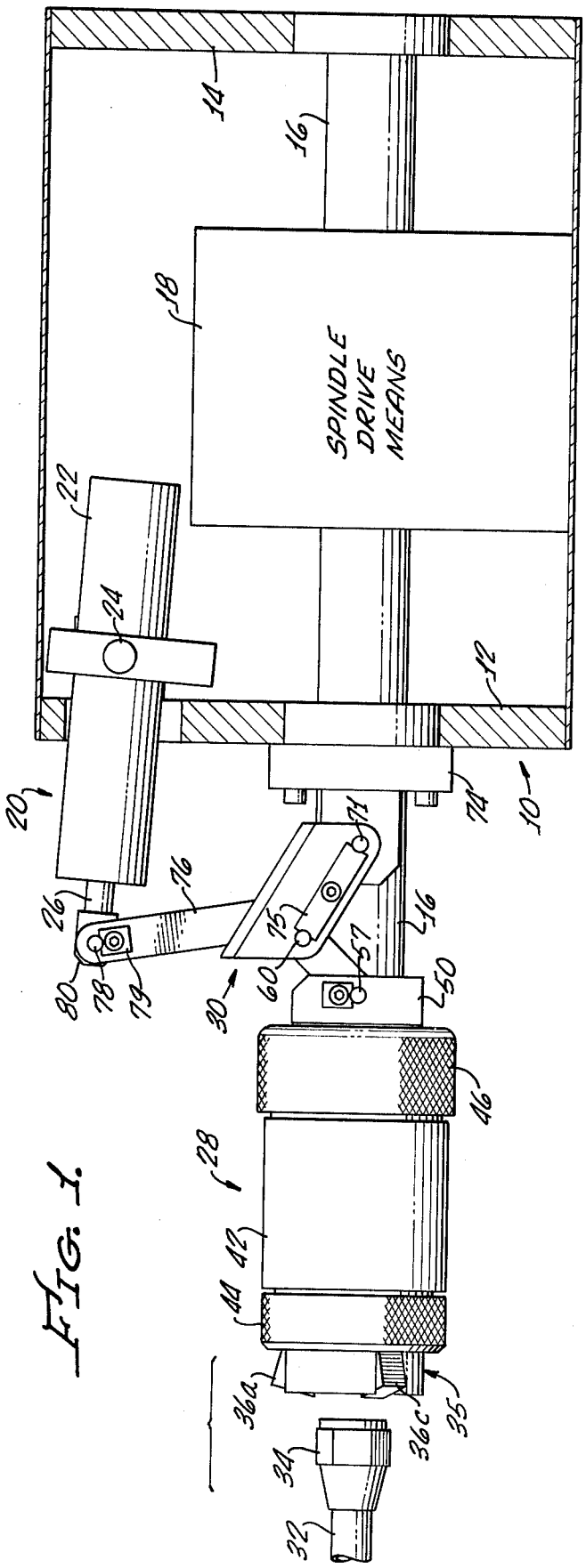

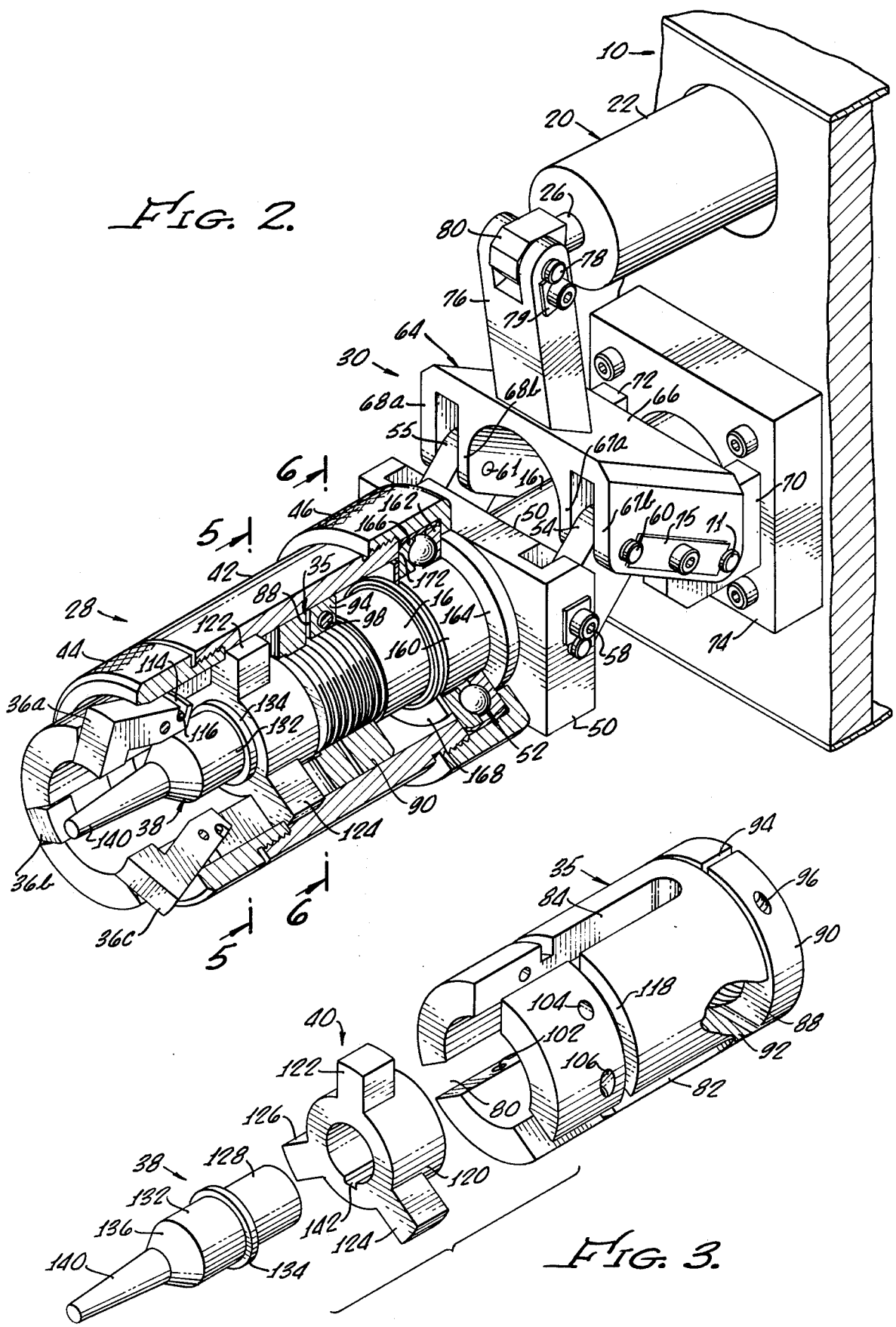

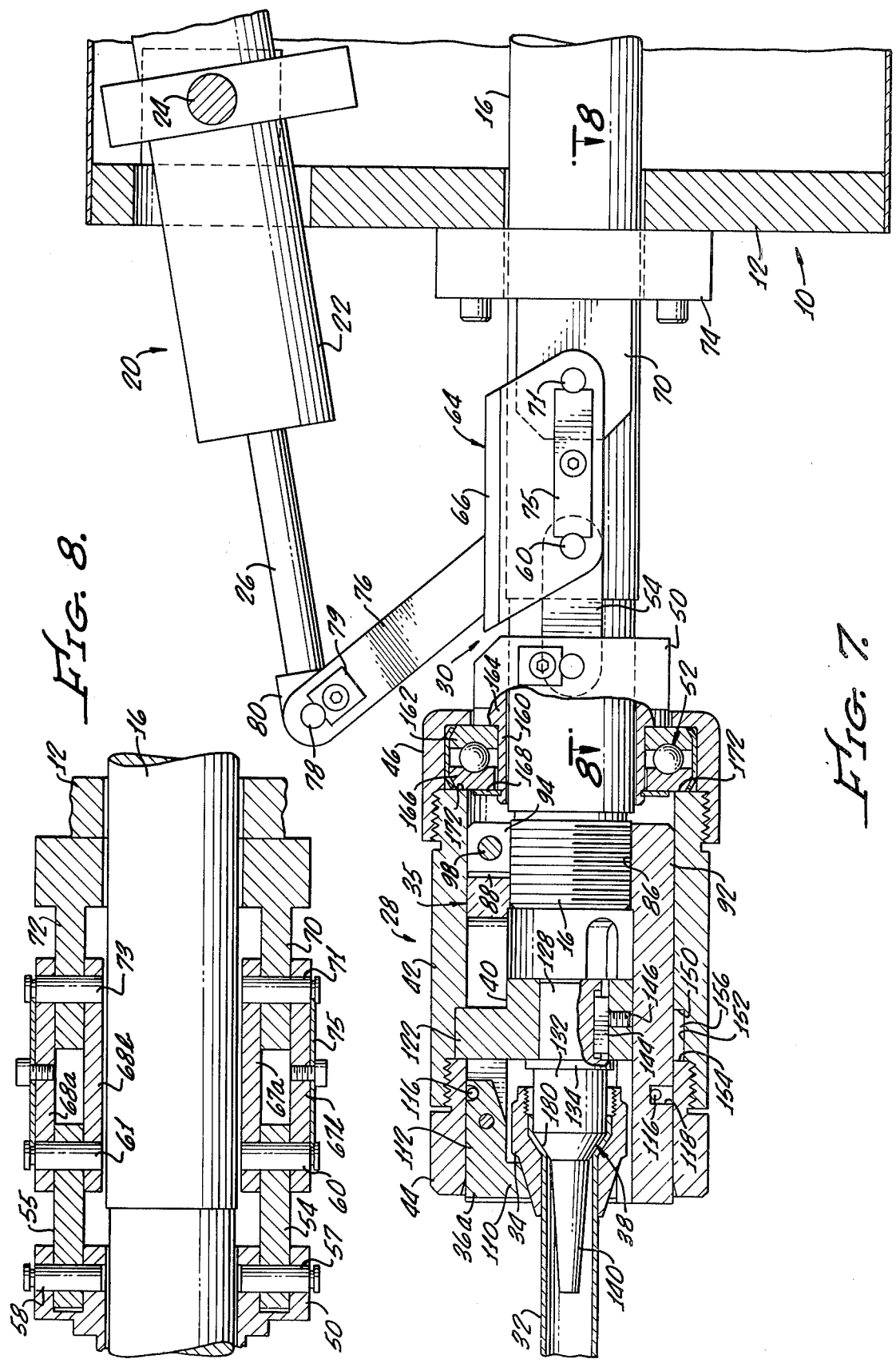

CHUCK WITH OPPOSED GRIPPING

BACKGROUND OF THE INVENTION

In various applications for handling elongated members such as tubes and solid rods, a member is often grasped at an end by a chuck which clamps the member by means of a number of radially inwardly driven clamping members. In the case of a hollow tube, the chuck may grip the tube internally by means of a number of radially outwardly driven clamps. Such chucks are used, among other applications, in pipe bending machines wherein a chuck is mounted upon a rotatable drive shaft which in turn is carried by a moving carriage. The chuck is employed to firmly grasp an end of a pipe to be bent which then may be longitudinally advanced toward a set of bend dies by linear motion of the carriage and the chuck. Plane of bend is determined by rotating the pipe, which is achieved by precisely rotating the chuck and its drive shaft on the carriage.

Certain manufacturing operations require the bending of a pipe or tube which has at least one flared end and carries a rotatable fitting thereon. The flaring operation requires a straight tube section of a minimum length for properly holding the tube. Some types of multiple bend tubes do not provide a properly located straight section of adequate length. For this reason, among others, the flaring and application of the fitting to the tube are preferably carried out before bending. Nevertheless, because of difficulties encountered in grasping the end of a previously flared tube and fitting in conventional chucks, it may be necessary to either bend the tube before it is flared and provided with the fitting or complex tube grasping arrangements must be used. In certain applications an additional straight tube section has been tightly threaded to the tube fitting to enable the tube to be grasped in a conventional chuck for the bending operation. Where the tube is too small to receive a conventional internal chuck, the bending or other handling of such flared tubes has presented significant problems.

Accordingly, it is an object of the present invention to provide a chuck that avoids or minimizes the above-mentioned problems and permits the ready handling of flared tubes and tubes with movable fittings thereon.

SUMMARY OF THE INVENTION

In carrying out principles of the present invention in accordance with a preferred embodiment thereof, a chuck for grasping the end of an elongated member comprises a shaft, a plurality of clamps movably mounted on the shaft for engaging and grasping the outside of the member at an end thereof, a pilot slidably mounted on the shaft for engaging and axially pressing against the member in opposition to the clamps, and means operatively associated with the shaft for driving the clamps into engagement with the member and for driving the pilot against the member in opposition to the clamps. According to a feature of the invention, the clamps and pilot are mounted on and rotatable with a rotatable shaft and both clamps and pilot are actuated by an axially shiftable sleeve which, in turn, is driven by a thrust block slidable along the shaft but not rotatable therewith.

BRIEF DESCRIPTION OF THE DRAWINGS

FIG. 1 is a side elevation schematically showing the carriage of a tube bending machine having mounted thereon a rotatable chuck embodying principles of the present invention;

FIG. 2 is a pictorial illustration with parts broken away showing the chuck of FIG. 1 in open position;

FIG. 3 is an exploded pictorial view of the chuck pilot assembly and shaft adapter;

FIG. 4 is a front elevation of the chuck;

FIGS. 5 and 6 are sections taken on lines 5—5 and 6—6 of FIG. 2, respectively;

FIG. 7 is a side elevation, with parts broken away, showing the chuck gripping a flared tube and fitting; and FIG. 8 is a sectional view of the chuck drive linkage, taken on lines 8—8 of FIG. 7.

DETAILED DESCRIPTION

FIG. 1 functionally illustrates a tube bending carriage 10 having front and side walls 12 and 14 in which is rotatably mounted a drive shaft or spindle 16 to be driven by a spindle rotating drive 18 mounted on the carriage. A chuck drive motor such as a gas or hydraulic motor 20 includes a cylinder 22 pivoted on the carriage about a horizontal axis 24 and an axially extensible driven piston rod 26 mounted in the cylinder. Details of the carriage, spindle drive means and chuck drive motor form no part of the present invention, but these may be of the type shown in my prior U.S. Pat. No. 3,974,676 for Tube Bending Machine and Carriage Therefor.

Mounted on the forward end of the driven shaft 16 is a chuck generally designated at 28 which is in part fixed to the shaft 16 for rotation therewith. The chuck is actuated by means of a drive linkage generally indicated at 30 which interconnects the carriage, the chuck and the chuck actuating motor 20. The chuck is specifically adapted to firmly clamp the flared end of a tube 32 on the flared end of which is rotatably mounted a conventional flare-type fitting 34. Such a fitting is often internally threaded for connection of the flared tube end to other tubes or fittings (not shown). It is desired to firmly grasp the end of the tube 32 and make a number of bends in portions of the tube (not shown) which are remote from the fitting 34. To make these bends, the tube end is firmly grasped in the chuck 28 and the carriage 10 is longitudinally advanced (in the direction of the axis of the shaft 16 and tube 32, the latter being positioned coaxially with the shaft) until a portion of the tube 32 at which a bend is to be made is positioned adjacent the bending machine bend dies (not shown). In order to accomplish the desired bend in a predetermined plane, that is to select a desired plane of bend, the tube 32 must be rotated about its axis to a preselected position. To accomplish this rotation, drive means 18 is operated to rotate shaft 16, which thereby rotates the chuck and the tube. The flared tube with its rotatable fitting thereon is firmly grasped for both longitudinal motion and precise rotational positioning by means of the chuck embodying principles of the present invention.

In general, the chuck comprises a shaft adapter 35 (described more fully below) fixedly mounted on an end of the shaft 16. The adapter carries mutually opposing chuck gripping means. These opposing gripping means comprise on the one hand a plurality of clamps 36a, 36b, 36c pivotally mounted on the end of the adapter, and a pilot assembly slidably mounted on the adapter, as will be more particularly described below. The pilot assembly includes a pilot 38 carried in a pilot holder 40 (see FIG. 3). Also slidably mounted on the adapter in driving relation with clamps 36 and pilot holder 40 is a chuck housing comprising a circular cylindrical sleeve 42, a forward end cap 44 threadedly secured to an internally threaded forward end of the sleeve 42, and a thrust bearing cap 46 threadedly mounted on an externally threaded rearward end of the sleeve.

A non-rotational thrust block 50 carries a thrust bearing 52 by means of which axial thrust is transmitted from the thrust block to the sleeve 42.

The thrust block is driven by a pair of toggle links 54, 55 which are each pivoted at one end to the thrust block on pins 57, 58, respectively. The toggle links are each pivoted at their other ends, by pins 60, 61, respectively, to a furcated arm 66 of a bell crank lever 64. Furcated arm 66 straddles shaft 16 and has a pair of furcated legs 67a, 67b and 68a, 68b that respectively receive ends of toggle links 54, 55 and their pivot pins 60, 61. The furcated legs of bell crank lever arm 66 are also respectively pivoted to a pair of forwardly projecting arms 70, 72 of a chuck mounting bracket 74 by a pair of pins 71, 73. Pins 71, 73 are held in place by a retainer plate 75 screwed to the lever and projecting into circumferential slots in the pin ends. The other pivot pins are similarly secured. Bracket 74 is fixedly bolted to the front wall 12 of the carriage 10. Bell crank lever 64 has a second arm 76 fixedly connected to the furcated lever arm 66. Lever arm 76 is pivoted upon a pin 78 to a rod end 80 that is fixed to the end of rod 26 of the chuck drive motor 20. Pin 78 is held in place by a retainer plate 79.

As can best be seen in FIG. 3, shaft adapter 35 is a hollow circular cylindrical body having a plurality of circumferentially equally spaced slots 80, 82, 84 extending axially from a forward end of the body to a point adjacent to but short of the rear end of the hollow body. The interior of the body, for a distance forwardly of its rear end, is threaded as at 86, and a slot 88 is cut in a diametral plane nearly, but not entirely, through the body across the threaded end section. This defines an integral collar 90 on the rear end of the adapter body which is connected to the main body portion by a relatively narrow section 92.

Collar 90 is severed at a point opposite section 92, as by an axial cut indicated at 94, and is formed with a threaded aperture 96 extending across the faces of the slot 94 in a diametral plane at a distance radially spaced from the body axis. A bolt 98 (FIG. 6) threaded into the aperture 96 draws the two sections of the collar together to fixedly clamp the collar upon the shaft 16 after the adapter has been threaded upon the shaft until it is axially adjusted to a desired position.

Across each adapter slot adjacent the forward end of the adapter is formed an aperture such as apertures 102, 104, 106, in which are received pivot pins which pivotally mount the three clamps 36a, 36b and 36c for pivotal motion in planes containing the shaft axis. Each clamp is an L-shaped member having a first leg 110, extending substantially radially inwardly, and a second leg 112, extending axially. Each clamp is pivoted to the adapter adjacent an end of its axial leg 112. At the end of leg 112 of each clamp, on a side of the clamp pivot pin remote from the clamp leg 110 is formed a transverse recess 141. The recess receives a resilient rubber ring 116 which circumscribes the end of the chuck, is received within the recesses 114 of all of the clamps, and is also received within a circumferential recess 118 formed in the outer surface of the adapter just to the rear of the clamp mounting pivot apertures thereof.

Pilot holder 40 comprises a central hub 120 and a plurality of circumferentially equally spaced radially projecting tongues 122, 124, 126. Each of the tongues extends into and is slidably guided within a respective one of the slots 80, 82, 84 of the adapter and each has an end portion extending radially beyond the adapter for purposes to be described below. Detachably mounted within a central bore of holder 40 is the pilot 38 having a rear section 128 with a key slot 130 formed therein (FIG. 5) and an intermediate section 132 separated from the rear section by a circumferential flange 134. Intermediate section 132 is formed with a forward tapered tube engaging section 136, which is the gripping surface of the pilot, and merges into a forward tapering guide section 140 that insures entry of the pilot into a tube to be clamped. Holder 40 is formed with an interior key slot 142 that slidably receives a key 144 mounted in key slot 130 of the pilot so that the pilot and holder may be detachably connected to each other by sliding the rear section of the pilot into the bore of the holder hub and inserting a set screw 146 through an aperture formed in the holder hub to allow the screw to bear upon the key 144. The parts of the pilot assembly are thus firmly but detachably secured to each other.

The chuck housing comprises the housing sleeve 42, the end cap 44, and the thrust bearing cap 46. The interior of the sleeve 42 is formed with an internal peripheral shoulder 150 (FIG. 7) positioned at the rear end of an internally enlarged portion 152 of the sleeve. Shoulder 150 and enlarged portion 152 cooperate with the end cap 44, specifically, with the rear end surface 154 thereof, to define an annular slot 156 that receives the radially outermost ends of each of the three pilot holder tongues 122, 124 and 126.

Thrust block 50 has an axial bore which has a diameter slightly larger than the diameter of shaft 16 and includes a forwardly extending shank or retainer 160, the outer surface of which forms an inner retainer upon which the thrust bearing 52 is mounted. Thrust bearing 52 has a rearward race 162 that engages, in axial thrusting relation, the forward face of a collar 164 of thrust block 50. A forward race 166 of the thrust bearing, which is held in place upon the thrust bearing retainer 160 by means of a lock ring 168, bears against a rear end face 172 of housing sleeve 42, whereby axial thrust may be transmitted from the thrust block through the bearing to the housing.

In open position of the chuck, as illustrated in FIGS. 1 and 2, the chuck drive piston rod 26 is retracted, bell crank lever 64 is in a position of relative clockwise rotation about its fixed pivot pins 71, 73, and toggle links 54 and 56 are in a position of relative counterclockwise position about their pivot pins 57, 58, whereby the thrust block 50 is in an axially retracted position (toward the right as viewed in FIG. 1). The chuck housing, including elements 42, 44 and 46, are also in retracted position. The pilot holder and pilot are retracted and clamping members 36a, 36b and 36c are pivoted to an open position by contraction of the resilient ring 116.

The end of the tube to be grasped is inserted into the end of the chuck with the flared end of the tube completely inside the end of the shaft adapter 35. Thus the fitting 34 is almost entirely within the adapter but may have a small rear portion extending therefrom. The end of the tube slides over the end of pilot guide 140, thus properly centering the tube within the open chuck.

Now motor 20 is actuated to extend rod 26, pivoting bell crank lever 64 in a counterclockwise direction about its fixed pivots 71, 73. The furcated lever arm 66 now straddles the shaft 16 in close adjacency thereto, with legs 67, 68 lying on opposite sides of the shaft. This causes toggle links 54, 55 to pivot about pins 57, 58 in a clockwise direction. This motion of the toggle links drives the thrust block 50 forwardly (toward the left as viewed in FIG. 7) and, via thrust block collar 164, drives thrust bearing 52 toward the left, or forwardly. The furcated configuration of bell crank arm 66 allows a longer chuck actuating stroke and maintains a compact package. The thrust bearing, in axial driving engagement with the rear end of housing sleeve 42, drives the sleeve forwardly, carrying bearing cap 46 and housing end cap 44 therewith. As the housing cap 44 moves forwardly, the forward inner edge thereof, which is slightly chamfered as shown in the drawings, engages the radially outward surfaces of the longer legs 112 of each of the clamps and drives these inwardly about their pivotal connections within the slots of the adapter. This pivotal motion of the clamps drives the inner legs 110 thereof substantially radially inwardly into engagement with the outer surface of the fitting 34.

The same motion of the housing sleeve 42 which drives the clamps 36a, 36b and 36c, also drives the pilot holder and pilot forwardly. In this operation the annular shoulder 150 of sleeve 42 is in axial driving engagement with the radially projecting tongues 122, 124 and 126 of the pilot holder and drives the holder forwardly. The holder in turn engages the pilot collar 134 and by this engagement (assisted by the set screw 146) drives the pilot forwardly until the tapered surface 136 of intermediate section 132 of the pilot engages the inner surface of the flared portion 180 of the tube. Thus the end of the tube, including the rotatable fitting thereon, is gripped by the opposed gripping members as shown in FIG. 7. These opposed gripping members comprise the group of clamps 36a, 36b and 36c which exert both a radial inward force on the fitting and an axial force (toward the right as viewed in FIG. 7). The inwardly facing ends of clamp legs 110 are tapered axially of the chuck and also curved to mate with the conical outer surface of the fitting 34. The taper helps to cause the clamps to exert an axial rearwardly directed force upon the fitting. Forces exerted by the clamps, and particularly the axial force, are opposed by the tapered surface 136 of the pilot which presses the inside of the tapered tube section toward the left and, of course, because of its inclination, also exerts a force having radially directed components.

The mutually opposed gripping action of the clamps and the pilot forcibly presses the fitting 34 against the end of the tube and in effect locks the fitting to the tube end and locks both the fitting and the tube to the clamp. Thus the tube with its fitting may be readily handled. it may be moved axially by axially moving the entire chuck, and, by rotating the chuck drive shaft 16, the tube may be rotated to any selected rotational position.

Rotation of chuck drive shaft 16 rotates the shaft adapter which is fixed to the shaft and rotates both the pilot and the clamps. The pilot holder is rotated by engagement of the tongues in the adapter slots 80, 82, 84. Each provides a rotational drive of the holder upon rotation of the slot and adapter. The pilot 28 is rotated by key 130. The clamps are pinned to the adapter and therefore are rotatable therewith. The chuck housing is rotatable with the adpater and holder by the frictional engagement of the sleeve 42 with the adapter and, primarily, by the frictional engagement of the interior of end cap 44 with the clamps 36a, 36b and 36c, since the end cap is radially pressed against the outside of the clamps by the opposed gripping action of the chuck.

The axial drive of the chuck, which is provided by the thrust block 50 and thrust bearing 52, is isolated from the rotatable elements by means of the thrust bearing 52. Thus the motor 20, bell crank 64, links 54, 55 and the thrust block are all mounted for rotation relative to the chuck drive shaft. Actually these elements are fixed against rotation with respect to the carriage in which are rotatably mounted the shaft 16 and all of the rotatable chuck elements. There is substantial clearance between the aperture at the rear end of the end cap 56 and the thrust block 50, and also substantial clearance between the shaft 16 and the interior of the thrust block bearing retainer 160, to permit relative rotation of the chuck housing and thrust block 50.

To open the clamp from the closed position, motor 20 is operated to retract piston rod 26, thereby, via the bell crank and toggle links, retracting the thrust block 50. Retraction of the thrust block 50 causes the lock ring 168 to retract the thrust bearing which moves the housing end cap 46 rearwardly. This retracts sleeve 42 and end cap 44, the rear end of the latter bearing upon the holder tongues to retract the holder and pilot. As the end cap is retracted beyond the pivot point of the clamps, the resilient ring 116 pivotally retracts the clamps whereby the tube and its fitting may be withdrawn from the chuck.

The shaft adapter, and thereby the holder and pilot carried thereon, are axially adjustable along the shaft 16 in order to adjust the closed positions of the opposed gripping elements of the chuck, thereby to control the gripping pressure and to accommodate fittings and tubes of slightly different dimensions. This axial adjustment is achieved merely by rotating the adapter upon the threaded end of the shaft 16. Upon achieving the desired axial position of the adapter relative to the shaft, the collar clamping bolt 98 is tightened to force the collar tightly upon the shaft and to lock the adapter in position. For convenient adjustment of clamp bolt 98 without complete disassembly, a slot 182 is formed in the housing sleeve 42 to enable access to the clamping bolt.

The chuck is readily adapted to handle flared tubes (with fittings thereon) of different sizes merely by changing several readily removable parts. Thus for a flared tube of a larger diameter, pilot 38 is removed from holder 40 and a pilot having a larger diameter intermediate section 132, larger diameter tapered surface 136 and a larger guide section 140, but having an identical rear section 128, is substituted for the smaller pilot. This is readily achieved by removing the end cap 44 and sleeve 42 and loosening set screw 145 to remove the one pilot and reversing the procedure for insertion of the larger pilot.

To accommodate the different outside diameter of the different sized tube and fitting, clamps 36a, 36b and 36c are also replaced. To accommodate a larger diameter tube, the clamps are replaced with clamps having shorter clamping legs 110 and suitably varied taper and curvature at their radially inner ends, but otherwise identical to the substituted clamps. For a smaller diameter tube and fitting, clamps having longer legs 110 and different end taper and curvature are employed together with a pilot of smaller diameter. The clamps, of course, are readily removed and replaced by unscrewing end cap 44, removing the pivot pins that mount the clamps within the adapter slots and removing the resilient clamp retracting ring 116.

Although three clamps, three adapter slots and three pilot holder tongues are shown, it will be readily appreciated that the number of these may be more or less than three. The chuck may be adapted to grasp a solid member having an enlarged end merely by modifying pilot 38 to bear upon the end of the solid member instead of entering the end of the tubular member illustrated. Other driving linkages may be employed, the pilot assembly may be formed in one piece, and other arrangements may be used to secure the adapter to the shaft. Although pivoted clamps are presently preferred, the clamps may be movably mounted in various ways, with or without pivoted motion, to be forced inwardly to grip the outside of the member to be grasped in the chuck.

The foregoing detailed description is to be clearly understood as given by way of illustration and example only, the spirit and scope of this invention being limited solely by the appended claims.

What is claimed is:

1. A rotatable chuck for grasping the end of a hollow elongated member having a flared end and a fitting thereon and exerting both radial and axial compressive force thereon comprising,
   a rotatable shaft,
   a plurality of clamps movably mounted on said shaft for pressing the outside of said member at said end thereof radially and axially inwardly,
   a pilot slidably mounted on said shaft and having a tapered end for pressing radially and axially outwardly against said member in radial and axial opposition to said clamps, said pilot having a radially projecting tongue on a rear portion thereof,
   a sleeve slidably mounted on said shaft, said sleeve including first means for engaging said tongue to press said pilot axially and including second means for engaging said clamps to press said clamps inwardly, and
   means for driving said sleeve into engagement with said tongue and clamps for pressing said pilot axially and radially outwardly against said member in opposition to said clamps.

2. The rotatable chuck of claim 1 wherein said drive means comprises thrust means movable axially of said shaft and restrained against rotation therewith.

3. The chuck of claim 1 wherein said member has an enlargement on an end thereof, said clamps being mounted for inward substantially radial motion to engage said enlargement, and said pilot being adapted to abut said end of said member.

4. The chuck of claim 1 wherein said drive means includes first means rotatable with said shaft and second means rotatable relative to said shaft for axially shifting said first means.

5. The chuck of claim 4 wherein said first means comprises a sleeve mounted to slide along said shaft in driving engagement with said clamps and pilot, and wherein said second means comprises a thrust block mounted to slide along said shaft in axial driving engagement with said sleeve, said thrust block being rotatable relative to said sleeve.

6. The chuck of claim 1 wherein said elongated member comprises a tube having a flared end, said pilot including a tapered section adapted to enter said tube end and bear against the inside of the flare at said tube end.

7. The chuck of claim 6 wherein said pilot includes a tapered alignment guide secured to and extending forwardly of said tapered section.

8. The chuck of claim 6 wherein said flared end includes a relatively movable fitting thereon, said clamps adapted to engage and grasp the outside of said fitting, whereby said tube end and fitting are subjected to a gripping force between said pilot and said clamps.

9. The chuck of claim 1 wherein said means for driving said clamps and said pilot comprises a sleeve circumscribing said shaft and a thrust block mounted for slidable motion along said shaft and for rotation relative to said shaft, said sleeve being in axially driven engagement with said thrust block and having means in driving engagement with clamps and pilot.

10. The chuck of claim 9 including a shaft adapter fixed to said shaft, said pilot being slidably and non-rotatably mounted on said adapter.

11. The chuck of claim 9 including a shaft adapter fixed to said shaft and having a longitudinal slot, said pilot including a follower tongue slidably received in said slot, said clamps being movably mounted on said shaft adapter.

12. The chuck of claim 11 including means for axially adjusting said adapter relative to said shaft.

13. The chuck of claim 11 wherein said pilot includes a forward section adapted to engage the end of a flared tube that is to be grasped by the chuck, and having a rear section slidably mounted upon said adapter.

14. A rotatable chuck for grasping the end of an elongated member comprising,
   a rotatable shaft,
   a plurality of clamps movably mounted on said shaft for engaging and grasping the outside of said member at said end thereof,
   a pilot slidably mounted on said shaft for engaging and pressing against said member in opposition to said clamps,
   a shaft adapter comprising a hollow body having a plurality of circumferentially spaced longitudinal slots, said pilot having a plurality of circumferentially spaced follower tongues slidably received in respective slots, said clamps being pivoted to said adapter in respective slots, and
   drive means for driving said clamps into engagement with said member and for driving said pilot against said member in opposition to said clamps, said drive means comprising a sleeve circumscribing said shaft and a thrust block mounted for slidable motion along said shaft and for rotation relative to said shaft, said sleeve being in axially driven engagement with said thrust block and having means in driving engagement with said clamps and pilot.

15. The chuck of claim 14 wherein said hollow body is axially adjustable on said shaft, and including a split collar fixed to said hollow adapter body, and means for clamping said collar to and around said shaft.

16. A rotatable chuck for grasping the end of an elongated member comprising,
   a rotatable drive shaft,
   a plurality of clamps movably mounted on said shaft for engaging and grasping the outside of said member at said end thereof, a pilot slidably mounted on said shaft for engaging and pressing against said member in opposition to said clamps, a shaft adapter fixed to said shaft and having a longitudinal slot, said pilot including a follower tongue slidably received in said slot, said clamps being movably mounted on said shaft adapter, and drive means operably associated with said shaft for driving said clamps into engagement with said member and for driving said pilot against said member in opposition to said clamps, said drive means comprising a sleeve circumscribing said shaft and a thrust block mounted for slidable motion along said shaft and for rotation relative to said shaft, said sleeve being in axially driven engagement with said thrust block, said sleeve having an end thereof in driving engagement with said clamps and an internal shoulder in driving engagement with said pilot.

17. The chuck of claim 16 wherein said adapter includes a body having a plurality of circumferentially spaced longitudinally extending slots, and wherein said pilot includes a plurality of follower tongues each extending through a respective one of said slots into engagement with said internal shoulder of said sleeve.

18. The chuck of claim 17 wherein each said clamp is pivoted to said adapter and positioned in a respective one of said slots.

19. The chuck of claim 17 including means for rotatably driving said shaft, said adapter, said pilot, and said clamps, and means for axially driving said sleeve and said pilot relative to said shaft, said adapter and said clamps.

20. A rotatable chuck for grasping the flared end of a hollow tube having a flare fitting thereon so as to lock said fitting to said tube and lock said tube and fitting in said chuck, said chuck comprising, a support, a rotatable drive shaft journalled in said support, means for rotating said drive shaft, a shaft adapter fixed to an end of said shaft and comprising, a hollow body, and at least one axially extending slot formed in said body, a pilot having a tapered forward end portion for axially and radially pressing against the flared end of said tube, said pilot including at least one follower tongue slidably guided in said slot, a plurality of clamps pivotally mounted on an end of said adapter and each having a leg adapted to press axially and radially against the outside of said fitting, a thrust block mounted to slide along said shaft, a sleeve mounted to slide along said shaft, said sleeve being in axially driven engagement with said thrust block and having an end portion in driving engagement with said clamps, said sleeve having a shoulder in driving engagement with said pilot, and means connected to said support for axially driving said thrust block.

21. The chuck of claim 20 wherein said means for driving said thrust block comprises a toggle linkage connected to and between said support and said thrust block.

22. The chuck of claim 21 wherein said toggle linkage comprises a bell crank having a first arm straddling said shaft and pivotally connected to said support and a second arm fixed to said first arm, and a pair of toggle links on opposite sides of said shaft, each link being pivotally connected at opposite ends thereof to said bell crank and to said thrust block, respectively.

23. The chuck of claim 20 including a sleeve cap detachably connected to an end of said sleeve and comprising said sleeve end portion, said cap having an inner end adapted to engage said tongue to effect retraction of said tongue and pilot upon retraction of said sleeve.

24. The chuck of claim 20 wherein said pilot includes a forward body section having a tube engaging end section and a rear body section, said pilot tongue including a hub mounted on said rear body section and interengaging means on said pilot body sections and said hub for transmitting forward motion of said hub to said pilot body sections.

25. The chuck of claim 20 wherein said adapter includes a plurality of circumferentially spaced axially extending slots, and wherein each said clamp is pivoted to said adapter in a respective one of said slots.

* * * * *